United States Patent [19]

Fickel

[11] 4,046,638

[45] * Sept. 6, 1977

[54] METHOD FOR CONTROLLING HEAT INPUT TO THE REBOILER SECTION OF A DISTILLATION COLUMN

[75] Inventor: R. Gene Fickel, Roselle, Ill.

[73] Assignee: UOP Inc., Des Plaines, Ill.

[*] Notice: The portion of the term of this patent subsequent to May 6, 1992, has been disclaimed.

[21] Appl. No.: 653,570

[22] Filed: Jan. 29, 1976

Related U.S. Application Data

[60] Division of Ser. No. 586,447, June 12, 1975, which is a continuation-in-part of Ser. No. 459,973, April 11, 1974, abandoned.

[51] Int. Cl.² .............................................. B01D 3/42
[52] U.S. Cl. ........................................ 203/1; 202/206; 202/153; 196/132; 203/DIG. 18; 208/DIG. 1
[58] Field of Search ........................... 203/1, DIG. 18; 202/206, 160, 153; 196/132; 208/DIG. 1

[56] References Cited

U.S. PATENT DOCUMENTS

| | | | |
|---|---|---|---|
| 2,974,182 | 3/1961 | Van Pool | 203/1 |
| 3,225,550 | 12/1965 | Kelley et al. | 203/1 |
| 3,411,308 | 11/1968 | Bellinger | 203/1 |
| 3,826,719 | 7/1974 | Boyd et al. | 203/1 |
| 3,881,994 | 5/1975 | Fickel | 203/1 |

Primary Examiner—Wilbur L. Bascomb, Jr.
Attorney, Agent, or Firm—James R. Hoatson, Jr.; Robert W. Erickson; William H. Page, II

[57] ABSTRACT

A method for regulating, or controlling heat input to the reboiler section of a fractionation column. Flow-measuring means, disposed in a substantially liquid-free environment within the confines of the reboiler section, produces a signal which is representative of the quantity of vapor flowing from the reboiler section upwardly into the fractionation section. This signal is transmitted to heat-varying means, whereby fuel input to an external reboiler heater is regulated in response to the quantity of vapor flow.

3 Claims, 1 Drawing Figure

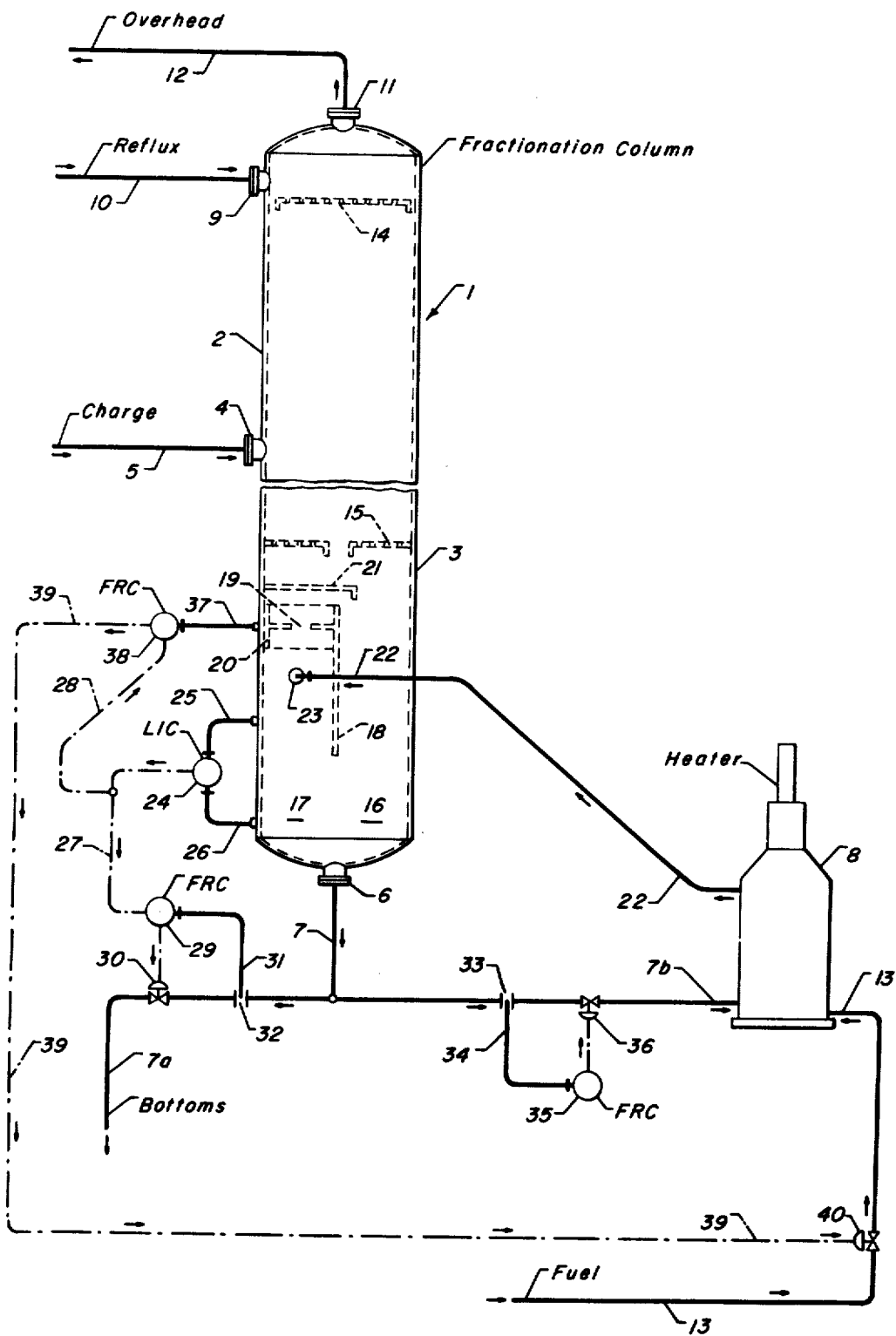

METHOD FOR CONTROLLING HEAT INPUT TO THE REBOILER SECTION OF A DISTILLATION COLUMN

RELATED APPLICATIONS

This application is a Division of my copending application, Ser. No. 586,447, filed June 12, 1975, which copending application is a Continuation-In-Part of my application, Ser. No. 459,973, filed Apr. 11, 1974 and now abandoned, all the teachings of which are incorporated herein by specific reference thereto.

APPLICABILITY OF INVENTION

The control system, encompassed by the present inventive concept, is particularly intended for integration into a fractionation, or distillation facility in which external reboiling of a portion of the liquid bottoms material is utilized to supply the heat required to effect the desired separation of feed stock components. The heater, which can be direct-fired, or the commom heat exchanger type, produces a heated, mixed-phase bottoms material which is reintroduced into the column via the reboiler section. Vapors pass upwardly into the fractionation section, while the liquid portion is generally withdrawn from the distillation facility in response to a liquid level control device. The quantity of vapors actually passing upwardly from the reboiler section has a direct effect upon the ultimately achieved separation. Also, while many factors contribute to thermal balance, or stability of the fractionation function, perhaps the most pronounced is the effect produced by the heat input via the reboiling operation. My invention affords a method of controlling this heat input which results in greater stability of both thermal balance and separation efficiency.

For the purpose of providing a clear understanding of the present control system and method, the definition of several terms, as employed herein and in the appended claims, is believed desirable. Thus, the use of the term "distillation column" is intended to include "fractionation column", "re-run column", "splitter column", "extractive distillation column", etc. Similarly, the "reboiler section" alludes to that portion of the distillation column below the lowermost tray, or deck; the "fractionation section" connotes the portion of the column above the reboiler section, and is inclusive of the "stripping zone" (below the feed tray) and the "rectification zone" (above the feed tray). In short, the present method of heat input control affords advantageous utility in facilities where separation of the components of a feed stock is effected by way of boiling point differential.

Processes, in both the petroleum and petrochemical industries, utilizing some form of fractionation facilities, are of a wide variety. Generally, these fall into one of two categories; the first being characterized by a reboiler liquid bottoms material having a comparatively wide boiling range. The second category is defined by a liquid bottoms material which is either a substantially pure compound, or a component mixture having a relatively narrow boiling range, about 10° F., or less. Exemplary of processes having distillation facilities, which can utilize the present invention is catalytic reforming, wherein the normally liquid portion of the reaction product effluent is re-run to provide a motor fuel having a particularly desired boiling range. Another application, to which the invention may be put, is the separation of ethylbenzene from a mixture thereof with various xylene isomers, or the separation of one particular isomer from the mixture. In the separation of an aromatic concentrate from a mixture with non-aromatics, the liquid bottoms material in the reboiler section of the extractive distillation column constitutes the solvent employed in admixture with the aromatics. Such processes, as well as many others, will benefit from the integration therein of the present invention; however, greater advantages and benefits are afforded those processes having a liquid bottoms material of the relatively narrow boiling range. The principal advantages concern improved stability with respect to the thermal balance of the column and an enhancement of separation efficiency in achieving the desired end product.

OBJECTS AND EMBODIMENTS

A principal object of my invention is to provide a method for controlling the reboiler section heat-input, and the control system therefor. A corollary objective affords a measurement of the actual quantity of vaporous material which passes upwardly into the fractionation section of a distillation column from the reboiler section thereof.

A specific object involves regulating the heat input from the reboiler heater in response to the vapor flow into the fractionation section. Ultimate objects include improved stability in the column's overall thermal balance and an enhancement in the steady-state character of separation efficiency.

These objects are achieved by providing a method for controlling heat input to the reboiler section of a distillation column, which method comprises the steps of: (a) withdrawing a single liquid bottoms stream from a partially-partitioned reboiler section; (b) regulating the quantity of a portion of said bottoms stream removed from said distillation column as a bottoms product, in response to the level of liquid within said reboiler section; (c) introducing the remaining portion of said bottoms stream into an external reboiler heater; (d) passing the heated, mixed-phase bottoms stream into a substantially liquid-free area of said partially-partitioned reboiler section and therein disengaging liquid from said heated mixed-phase; (e) measuring, within said liquid-free area, the quantity of vapor which passes from the partially-partitioned reboiler section into the fractionation section of said distillation column; and, (f) regulating the fuel input to said external reboiler heater in response to a signal representative of the measured quantity of vapor passing into said fractionation section.

In another embodiment, the present invention is directed toward a reboiler section, adapted to be disposed within a distillation column, which comprises, in combination: (a) a chordal baffle vertically-disposed in said reboiler section, terminating at its upper extremity a finite distance below the lowermost tray, or deck of said column and at its lower end a finite distance above the bottom of said column, thereby forming a partially-partitioned reboiler section having two chambers in open communication with each other at the bottom of said column; (b) a fluid outlet port in the bottom of said distillation column and a fluid inlet port in open communication with a first of said two chambers; (c) flow-measuring means, responsive to upwardly flowing vapors leaving said reboiler section, within said first chamber and disposed at the upper extremity thereof; (d) signal-sensing means, in open communication with said flow-measuring means, for transmitting a signal representative of the rate of vapor flow through said flow-measuring means, without the confines of said reboiler section; and, (e) an imperforate baffle, horizontally disposed between said lowermost tray and said flow-measuring means, said imperforate baffle extending entirely across said first chamber into the second of said two chambers and terminating a distance less than the internal diameter of said distillation column.

A specific embodiment of the invention herein described involves a control system for regulating heat input to the reboiler section of a distillation column which comprises, in cooperative combination: (a) a bottoms liquid-receiving chamber in said reboiler section; (b) conduit means for passing bottoms liquid from said receiving chamber to an external reboiler heater; (c) fuel-input conduit means in communication with said reboiler heater and fuel-varying means for adjusting the fuel input to said reboiler heater; (d) conduit means for passing heated, mixed-phase bottoms liquid from said reboiler heater into said reboiler section; (e) flow-measuring means, disposed within said reboiler section, responsive to upwardly-flowing vapors passing from said reboiler section into the fractionation section of said distillation column and determining the quantity thereof; (f) signal-receiving means in communication with said flow-measuring means for sensing and indicating a signal representative of the quantity of vapor passing into said fractionation section, said signal-receiving means being in communication with said fuel-varying means to transmit said signal to said fuel-varying means, whereby the heat input to said reboiler section is adjusted in response to the quantity of vapor; and, (g) flow-regulating means in communication with said receiving chamber for withdrawing excess bottoms liquid from said reboiler section and out of said distillation column.

These, as well as other objects and embodiments will become evident, by those possessing the requisite expertise in the art, from the following, more detailed description. In further describing my invention, reference will be made to the accompanying diagrammatic illustration which is presented to aid in the clear understanding thereof.

PRIOR ART

Candor compels recognition that, regardless of the character of the bottoms liquid in the reboiler section, the appropriate published literature is replete with multitudinous illustrations of control systems designed to maintain either thermal balance, or separation efficiency. No attempt will be made herein to delineate exhaustively the various schemes and techniques. It will suffice to present a few of the more prevalent systems.

As hereinabove stated, temperature control anywhere in the reboiler heated circuit falls short of achieving the desired end result. Similarly, a measurement of the flow of mixed-phase material in the return conduit is meaningless since the sensing means does not absolutely distinguish between liquid and vapor. Some methods have been proposed which rely upon a temperature measurement within the reboiler section; however, as above stated, this does not provide an accurate picture of the degree of vaporization which has been effected in the reboiler heater.

Exemplary of the prior art distillation techniques is that found in U.S. Pat. No. 3,411,308 (Cl. 62-21) and U.S. Pat. No. 3,225,550 (Cl. 62-21), both of which involve fractional distillation wherein a portion of the liquid bottoms material is withdrawn and introduced into an external reboiler heater, or heat-exhanger, with the heated material being re-introduced into the reboiler section. In both instances, however, the Patentees return a heated stream which is 100% vapor, as contrasted to a mixed-phase stream. Were it not otherwise, the presence of slugs of liquid phase would cause the flow-measuring devices employed by Patentees to give false and erratic readings, thus rendering the control systems inoperative. This is precisely the situation which is avoided through the use of the present invention wherein the vapor-measuring device is physically situated within the reboiler section, and the measurement is effected in a liquid-free environment. Neither of the Patentees recognize this technique, nor is the same to be found in the prior art. The present invention is a modification of the reboiler control system and reboiler section as found in my U.S. Pat. Nos. 3,881,994 (Cl. 202-160) and 3,888,743 (Cl. 202-158), respectively.

SUMMARY OF THE INVENTION

As previously indicated, many aspects connected with the fractional distillation technique are contributing factors with respect to the thermal balance and separation efficiency. Aside from the heat input to the reboiler section by way of the return of heated, mixed-phase bottoms material, such aspects include the rate and temperature of the reflux stream; the rate, temperature and composition of the feed stream; and, the locations of the reflux and feed trays. However, the effect of the reboiling operation appears to be the more pronounced. Heat input, by way of the mixed-phase material from the external reboiler heater, takes two forms: (1) the sensible heat of the liquid; and, (2) the latent heat absorbed by the vapors during vaporization. Of these two, the greater proportion of heat input can be attributed to the latter. Whether considering a comparatively wide boiling range bottoms liquid, a narrow boiling range liquid, or a substantially pure compound, control of the reboiler section heat input is tantamount to a successful, efficient operation.

Correlations of heat content (enthalpy) versus temperature, at varying percentages of vaporization will indicate a significant temperature differential (delta-T) per unit of enthalpy, when such correlations are directed toward liquid bottoms material having a comparatively wide boiling range. Therefore, a change in the temperature of the heated material from the external heater can be employed to adjust the heat input to the reboiler section, thus maintaining some semblance of thermal balance. However, where the liquid bottoms material is a substantially pure compound, or a component mixture having a narrow boiling range—i.e. 10° F., or less—the correlations show that very little, if any, delta-T is available for control use. That is, the temperature remains virtually the same regardless of the percentage vaporization. In such a situation, regulating the heat input by way of temperature measurement of the heated, mixed-phase material serves no useful purpose.

The shortcomings of the prior art are avoided by the present invention, the key to which evolves from the measurement of the quantity of vapor actually passing upwardly from the reboiler section into the fractionation section. A signal, representative of the vapor flow is appropriately received and transmitted to fuel-varying means in the fuel line to the external reboiler heater. The internal configuration of the reboiler section is such that all the vapor passing into the fractionation section passes through the flow-measuring means, and the measurement thereof is effected in a substantially liquid-free environment. The flow-measuring means is most conveniently either a venturi, or an orifice plate, and is disposed within its own vapor riser. A horizontally-disposed imperforate baffle is located below the lowermost tray and above the riser containing the flow-measuring means. Thus, liquid flowing downwardly from the lowermost tray, into the reboiler section, is prohibited from entering the vapor riser. Similarly, the level of liquid within the reboiler section is maintained out of contact with the flow-measuring means, but above the lower extremity of the vertical baffle disposed in the reboiler section. The control system of the present invention affords, therefore, the measurement of vapor flow in a substantially liquid-free environment.

DESCRIPTION OF DRAWING

The accompanying diagrammatic illustration is presented for the sole purpose of affording a clear understanding of the control system encompassed by the present invention. It is not, therefore, considered to have a limiting effect upon the scope and spirit of the present invention as defined by the appended claims. Referring now to the drawing, there is indicated a fractionation column 1 having a reboiler section 3 and a fractionation section 2. In this illustration, the reboiling function is effected through the use of a direct-fired heater 8. Column 1 contains a plurality of perforated decks, or trays, which generally number from 20 to 200, depending upon the service to be performed. These trays are disposed alternately from upper tray 14 to the lowermost tray 15. The feed stock is introduced through inlet port 4 via line 5; judicious design considerations usually provide more than one feed inlet, the precise number not being essential to the present control system and method. A liquid bottoms fraction is withdrawn through outlet port 6, via line 7, and an overhead vaporous fraction is removed through outlet port 11, via line 12. In many distillation operations, the overhead fraction is condensed and a portion of the liquid is returned to the column as reflux through inlet port 9 and line 10.

The internal flow-measuring means is shown as an orifice plate 19, disposed in a vapor riser 20. The vapor riser is in part formed by vertical baffle 18 which effectively partitions reboiler section 3 into two chambers, 16 and 17. An imperforate, horizontal baffle 21 is disposed between lowermost tray 15 and vapor riser 20. It should be noted that baffle 21 extends across the reboiler section a distance sufficient to cover riser 20. All the liquid flowing downwardly from lowermost tray 15 is diverted into chamber 16 with the result that vapor riser 20 and orifice plate 19 exist in a liquid-free environment. A portion of the liquid bottoms material is diverted through line 7b, containing orifice meter 33 and control valve 36, into heater 8. Excess bottoms liquid is removed from the fractionation facility through line 7a, containing orifice meter 32 and control valve 30. Heated bottoms material, in mixed phase, is re-introduced into reboiler section 3 by way of line 22 and inlet port 23. Fuel is supplied to heater 8 through line 13, containing control valve 40 which is adjusted in response to the signal transmitted from FRC 38. It should be noted that inlet port 23 discharges into chamber 17 at a locus above the lower extremity of vertical baffle 18. The vaporous portion passes upwardly through riser 20 and orifice plate 19, while the liquid portion flows into the bottom of reboiler section 3. A signal, representative of the vapor flow through orifice plate 19, is received by Flow Recorder Controller (FRC) 38 via conduit 37. The signal is transmitted through instrument line 39 to control valve 40, and the necessary adjustment is made in the quantity of fuel which is introduced into heater 8 via line 13.

Level Indicating Controller (LIC) 24, serviced by column taps 25 and 26, controls the quantity of liquid bottoms removal via line 7a. A representative signal is transmitted via instrument line 27 to reset the control point of FRC 29 which senses the rate of flow through orifice 32, by way of line 31. This type of "cascade" instrumentation is a preferred technique since it leads to smoother operation. LIC 24 can also transmit the liquid-level signal to FRC 38, via line 28, to reset its control point. This technique affords a measure of flexibility to the overall control system.

ILLUSTRATIVE EXAMPLE

In presenting this example of the operation of the present distillation column reboiler control system, it will be presumed that the column has attained steady-state operation and thermal balance while fractionating an aromatic hydrocarbon mixture from which it is desired to recover a substantially pure paraxylene stream as the bottoms material. At standard conditions, p-xylene boils at about 281° F. During this particular steady-state operation, LIC 24 is cascaded only with FRC 29 to adjust the flow of bottoms product material through line 7a. Therefore, only FRC 35 affects the rate of bottoms liquid to heater 8 through line 7b. Analyses indicate that a change in the composition of the charge stream in line 5 has taken place, the result of which is a lowering of the desired purity of the bottoms product. In effect, a greater quantity of liquid bottoms product is flowing from the column through line 7a. The set point of FRC 38 is adjusted via the signal from LIC 24, through line 28, in turn calling for increased vapor flow. This signal is tramsmitted via line 39 to control valve 40. The latter is caused to open wider to increase fuel flow through line 13. Additional vapors are produced, the desired product purity is again obtained and the column attains thermal balance and a steady-state operation.

I claim as my invention:

1. A method for controlling heat input to the reboiler section of a distillation column comprising said reboiler section and a fractionation section, which method comprises the steps of:
   a. withdrawing a single liquid bottoms stream from a partially-partitioned reboiler section;
   b. regulating the quantity of a portion of said bottoms stream removed from said distillation column as a bottoms product, in response to the level of liquid within said reboiler section;
   c. introducing the remaining portion of said bottoms stream into an external reboiler heater;
   d. passing the heated, mixed-phase bottoms stream into a substantially liquid-free area of said partially-partitioned reboiler section and therein disengaging liquid from said heated mixed-phase;
   e. measuring, within said liquid-free area, the quantity of vapor which passes from the partially-partitioned reboiler section into the fractionation section of said distillation column; and,
   f. regulating the fuel input to said external reboiler heater in response to a signal representative of the measured quantity of vapor passing into said fractionation section.

2. The method of claim 1 further characterized in that the quantity of vapor passing into said fractionation section is measured in a substantially liquid-free atmosphere.

3. The method of claim 1 further characterized in that said fuel input is reduced in response to increased vapor flow and vice versa.

* * * * *